Figure 3:
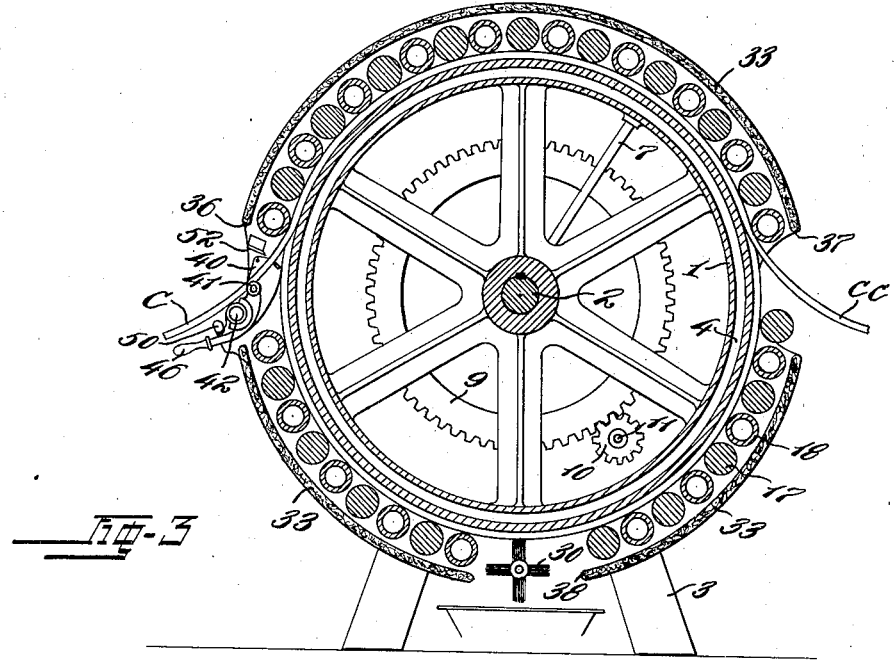

March 9, 1926. 1,575,700
H. F. MARANVILLE ET AL
PROCESS OF AND APPARATUS FOR MAKING RUBBER STRIPS
Filed Nov. 8, 1920 3 Sheets-Sheet 1
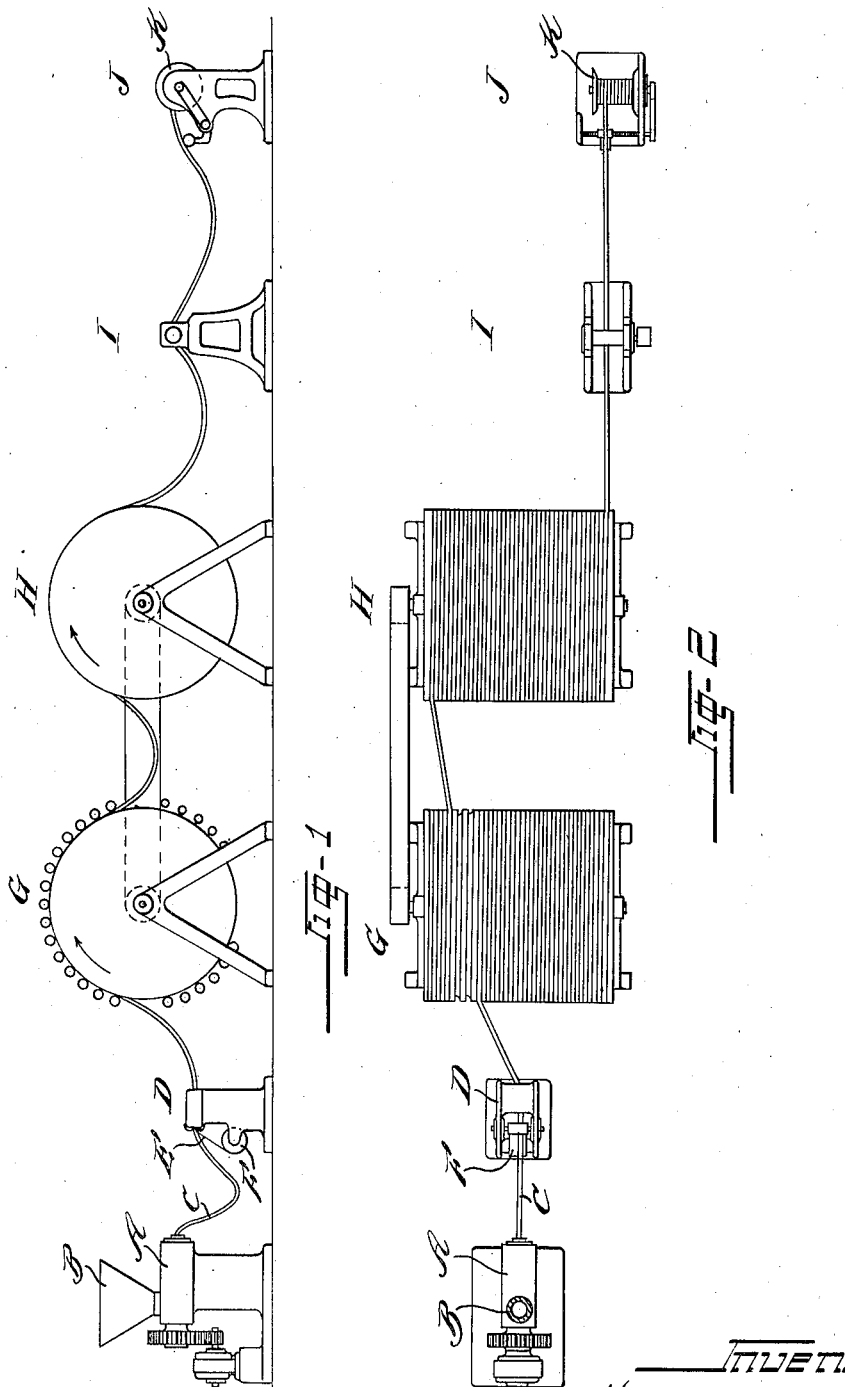

March 9, 1926. 1,575,700
H. F. MARANVILLE ET AL
PROCESS OF AND APPARATUS FOR MAKING RUBBER STRIPS
Filed Nov. 8, 1920 3 Sheets-Sheet 2

Inventor
Harvey F. Maranville
and Charles W. Steele
By Hull Smith Brock & West
Attys March 9, 1926.  1,575,700
H. F. MARANVILLE ET AL
PROCESS OF AND APPARATUS FOR MAKING RUBBER STRIPS
Filed Nov. 8, 1920  3 Sheets-Sheet 3
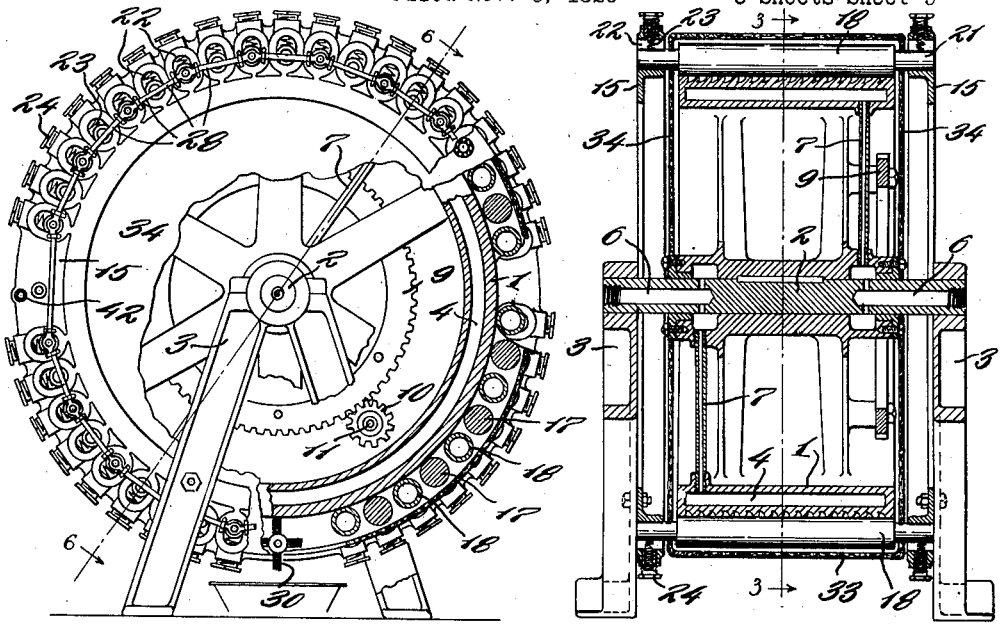
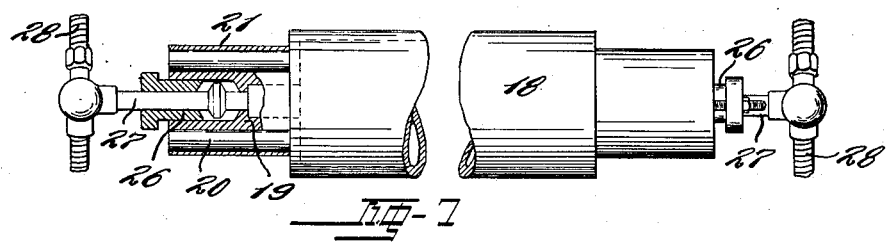
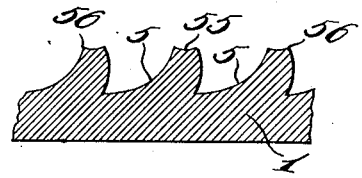
Inventor
Harvey F. Maranville
and Charles W. Steele
By Hull Smith Brock & West
Attys Patented Mar. 9, 1926.

1,575,700

UNITED STATES PATENT OFFICE.

HARVEY F. MARANVILLE AND CHARLES W. STEELE, OF AKRON, OHIO, ASSIGNORS, BY MESNE ASSIGNMENTS, TO THE FIRESTONE TIRE AND RUBBER COMPANY, OF AKRON, OHIO, A CORPORATION OF OHIO.

PROCESS OF AND APPARATUS FOR MAKING RUBBER STRIPS.

Application filed November 8, 1920. Serial No. 422,512.

*To all whom it may concern:*

Be it known that we, HARVEY F. MARANVILLE and CHARLES W. STEELE, citizens of the United States, residing at Akron, in the county of Summit and State of Ohio, have invented a certain new and useful Improvement in Processes of and Apparatus for Making Rubber Strips, of which the following is a full, clear, and exact description, reference being had to the accompanying drawings.

This invention relates to a process and apparatus for the production of flexible rubber strips of great length. It has been developed chiefly for the production of bead strips for pneumatic tires of the clincher type wherein the sides or lips of the tire casing are flexible and to some extent longitudinally elastic, being secured in place upon the wheel by means of a hook flange on the rim, but is not restricted to such use, since it is equally applicable to the production of molding, tubing, insulation, etc. The bead filler may be taken as an example merely, and consists of a flexible elastic rubber composition having a substantially triangular cross section, about which the fabric or cord parts of the tire casing are wrapped or fastened. Such strips have heretofore in the ordinary practice been formed and cured in grooves made in the reciprocable platen of a steam-heated press, which is a very ponderous and expensive machine and in addition is operated in an intermittent fashion, the material being first laid in the grooves, then subjected to heat and pressure for the requisite length of time and afterwards advanced to bring a new length of material into the range of the press. This mode of operation has necessitated a very large amount of handling of the material both before and after the curing operation, and has also rendered it difficult or impossible to afford all parts an equal cure owing to the uncertain heat conditions at the ends of the press. The objects of our invention are the provision of a process and apparatus whereby this curing may be effected in a continuous manner and with a minimum of handling; the provision of an apparatus of smaller size and greater productive capacity than heretofore; the provision of an apparatus which can be attended and operated by a smaller number of workmen and which shall deliver a product which is more uniform in size and cure than heretofore; while further objects and advantages of our invention will become apparent as the description proceeds.

Figures 4, 10:
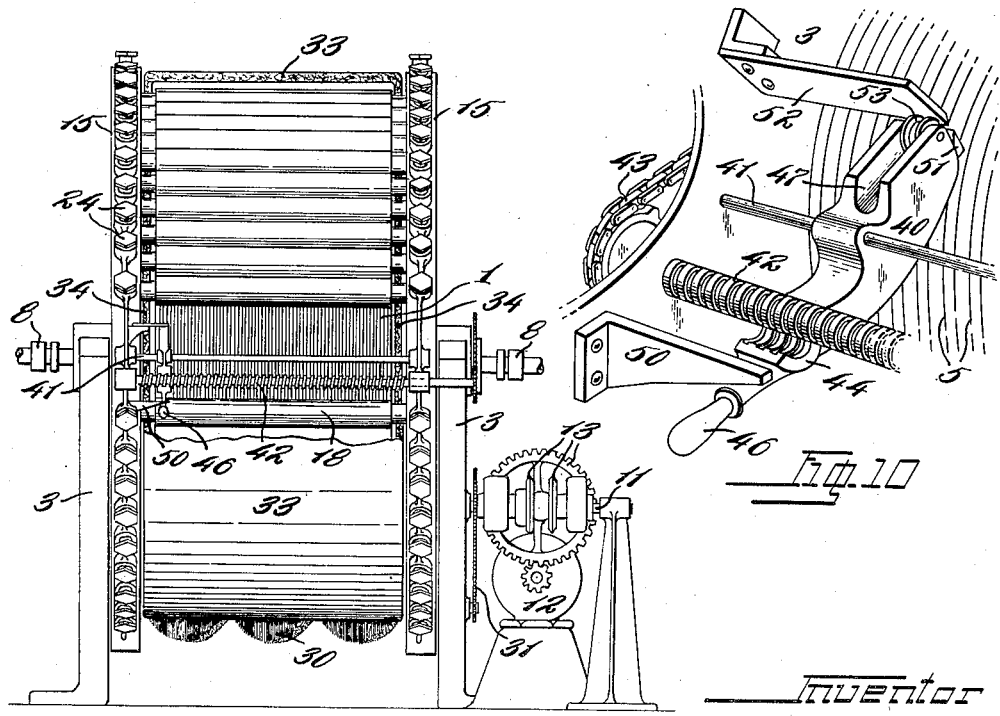

In the drawings accompanying and forming a part of this application we have illustrated one embodiment of our invention although it will be understood that these drawings are intended to illustrate only one of the many physical mechanisms in which our inventive idea can be utilized and that we are not restricted to the constructions or arrangements therein shown except as the same are specifically recited in the claims hereto annexed. In these drawings, Fig. 1 represents diagrammatically a complete apparatus for the production of tire beads according to our invention; Fig. 2 is a top plan view of the same; Fig. 3 is a vertical cross-section through the curing drum; Fig. 4 represents a left hand elevation of the device shown in Fig. 3, a portion of the enclosing shell being broken away; Fig. 5 represents an end elevation of the curing drum, a portion of the shell being broken away and part of the rollers being shown in cross-section; Fig. 6 is a sectional view corresponding to the line 6—6 of Fig. 5; Fig. 7 is a detailed view of one of the rollers; Fig. 8 is a detailed view of a portion of the surface of the drum; Fig. 9 is a cross sectional view of the bead filler made thereon; and Fig. 10 is a perspective view of the feeding member.

Describing by reference characters the parts shown in this drawing, A represents what is known as "a tube mill," in other words a mechanism by means of which raw rubber composition fed into the hopper B will be extruded in the form of a continuous strip C of the requisite cross-section, not necessarily tubular, but in the present case solid and either round or flat. From this machine the strip C passes through a suitable covering machine D where it is wrapped with a fabric sheath E drawn from a suitable spool or reel F, after which it passes to the curing drum G by means of which it is cured under heat and pressure for a suitable length of time, being kept in continuous uniform motion all the while. It then passes over or around a cooling drum H driven at the same peripheral speed as the curing drum, whereby the curing is arrested and the strip rendered non-adherent. It then passes through a trimmer I where any fin or irregular edge is removed, and is finally received by a winding machine J which coils the finished strip upon a spool K. The operation of all these mechanisms is continuous and unbroken, and our invention pertains generally to the complete process herein illustrated, and specifically to the construction and mode of operation of the curing drum G.

This device consists essentially of a cylindrical metal drum 1 mounted for rotation by means of a suitable shaft 2 and supporting bracket 3, the rim of the drum being hollow as shown at 4 for the admission of steam, and the exterior surface of the drum being formed with a continuous helical groove 5 of the requisite cross-section as shown in Fig. 8. The ends of the shaft 2 are hollowed out as shown at 6—6 and connected to the steam space of the drum by pipes 7—7, a suitable steam supply being admitted and discharged by means of suitable swivel joints 8—8 connected to the ends of the shaft. The drum is rotated by means of a ring gear 9 meshing with a pinion 10 carried by the shaft 11 which is rotated by means of the motor 12 through the agency of suitable gearing 13, the latter being preferably of a reversible nature so that the device can be run backward in case of accident.

Rigidly supported at each end of the drum are the carrying rings 15—15 in which are journaled a large number of rollers 17, 18, parallel to and in contact with the periphery of the drum. Each roller is formed with a reduced end 19 surrounded by anti-friction rollers 20 encased in a sleeve 21, the sleeves being loosely received in radial slots 22 formed in the ring and pressed yieldingly inward by means of springs 23 whose outer ends rest against screw plugs 24 by means of which the pressure of the rolls may be adjusted. In the present embodiment we have shown the rolls 17 as consisting merely of solid cylindrical bodies and the rolls 18 as hollow cylindrical metal bodies, the two alternating about the main drum, although it is equally within our invention to employ all rollers of either type or to intermingle the different types in any desired arrangement or proportion. Each of the hollow rollers 18 is formed at each end with a packing gland 26 communicating with a suitable steam pipe 27, the various pipes 27 being connected together by steam pipes 28 which are preferably of a flexible nature to permit the necessary relative movement of the different rollers, although the same result can be obtained by the use of movable joints.

At the bottom of the drum we preferably discontinue the rollers for a short space and locate at this point a suitable brush 30, arranged to sweep the drum as it passes and driven in any convenient manner as by the chain 31 shown in Fig. 4. Also at the two sides of the machine we preferably discontinue the rollers to afford spaces for the entrance of the raw strip and the escape of the cured bead. In order to economize heat and maintain a uniform temperature inside the apparatus we enclose the drum and rollers in a suitable shell of heat-insulating material such as asbestos, the shell having a cylindrical wall shown at 33 and flat end walls shown at 34—34, the portion 33 lying outside the various rollers, and the end walls 34 lying inside the rings 15 and being apertured for the passage of said rollers and of the shaft 11. The portion 33 of the shell is formed with a slot 36 for the admission of the uncured strip C, a slot 37 for the escape of the cured strip CC, and a slot 38 for the reception of the brush 30.

In the slot 36 we locate a feeding device 40 shown in perspective in Fig. 10. This device is slidable along a horizontal guide bar 41 under the influence of the feed screw 42 and the screw is driven from the shaft 2 by suitable means such as the chain 43 in such wise as to deliver the raw strip C accurately to the groove 5 as the drum rotates. In the form shown this guide bar 41 is cylindrical, and the feeding device is both slidable and rotatable relatively thereto, being formed opposite the screw 42 with a rigid half-nut 44 adapted to intermesh therewith. The weight of this device is so distributed as to tend at all times to hold this half-nut against the feed screw 42. This device is provided at one end with a handle 46 by means of which it can be moved out of contact with the feed screw and returned to starting position and also with a guide portion 47 through which the strip C passes. At the end of the machine towards which this device moves we preferably provide a rigid wedge 50 adapted to engage a suitable part of the feeding device and rock the same out of contact with the feed screw so that the machine will not be injured by overrunning; and we also arrange the feeding device so as to pass closely by a fixed knife blade 52 carried by the machine frame so that the strip is automatically severed at the instant its feed is interrupted. The guide portion 47 of this device is made to receive the strip sufficiently tightly so that the same will not fall therefrom when severed, for example by the employment of a friction roller 53.

The mode of operation is as follows: The tube mill being started, the raw strip C issuing therefrom is threaded through the wrapping machine D where it is encased in the usual manner, then threaded through the guide portion of the device 40 and pressed into the initial turn of the groove 5. The adhesion of the raw gum is usually sufficient to hold it in this groove and this can be increased if desired by a suitable cement. By a continued rotation of the drum 1 and the gradual movement of the device 40, the strip is caused progressively to fill the entire length of the groove, being all the time subjected to the heat of the drum and of such of the rollers as are themselves heated, the pressure requisite to proper curing being meanwhile effected by the springs 23 and plugs 24. The diameter of the drum, the number of turns of the groove, and the speed of its rotation are so chosen that by the time the groove is entirely filled the first portion of the strip will have been cured for a sufficient length of time, for example twenty minutes. As an example of a very practical arrangement we employ a drum having a diameter of 64 inches and a length of 32 inches formed with a spiral groove of 32 turns, thus providing a groove length of one thousand feet. We rotate this drum at a peripheral speed of fifty feet per minute, employing therewith a tube mill of equal capacity, and as a result the strip in the initial groove has received a twenty minute cure by the time the last groove is filled.

When this time occurs the attendant introduces a suitable tool through the slot 37 beneath the advancing end of the strip and pries it away from its groove, carries it around the cooling drum H, through the trimmer I, and to the winder J. Also as soon as the rotation of the drum has emptied the first groove, the incoming strip is again applied thereto, the feeding device 40 being returned to its starting point for this purpose. Thus by merely starting the feed at the initial turn of the groove at fixed periods dependent upon the rate of rotation in the drum, the cure is made a continuous one, every portion of the strip is given the same cure, the capacity of the tube mill is exactly equalized, and the raw strip passes continuously from the tube mill to a single final spool without intermediate handling other than a momentary shift every thousand feet.

By reference to Fig. 8, it will be seen that between adjacent grooves we have shown the drum exterior as slightly concaved at 55, providing sharp ridges 56 at each side. As a result of this, any excess of rubber composition beyond that which will fill the groove is caused to flow laterally over the drum surface where it is severed by the pressure of the rollers and removed by the brush 30. In fact this expedient largely and in some cases entirely dispenses with the necessity of any trimming machine at I.

It will be understood that we do not restrict ourselves to the particular features of construction, design, or arrangement herein shown, except as pointed out in our claims; and also while we have produced an apparatus and process primarily for the manufacture and curing of bead strips, we do not restrict its employment to that purpose as we are convinced of the utility of the machine for making and curing numerous other articles and devices such as molding, insulation, tubing, belting and the like, both of rubber and of other plastic substances.

Having thus described our invention, what we claim is:

1. Mechanism for curing rubber strip comprising a constantly moving member having a grooved surface, a second constantly moving member opposite said surface and closing the groove therein, means forcing said members yieldingly together at all times, and means for heating both members.

2. Mechanism for curing rubber strip comprising a cylindrical drum having in its surface a groove of the same cross-section that the strip is to present, a plurality of rollers surrounding said drum having their axes parallel to the drum axis, means for rotating the drum, and means for heating said drum and rollers.

3. Mechanism for curing rubber strip comprising a cylindrical drum having in its surface a groove of the same cross-section that the strip is to present, a plurality of rollers surrounding said drum and having their axes parallel to the drum axis, means tending to force said rollers toward said drum, means for rotating said drum, and means for heating said drum and rollers.

4. Mechanism for curing rubber strip comprising a cylindrical drum having in its surface a groove of the same cross-section that the strip is to present, a plurality of rollers surrounding said drum and having their axes parallel to the drum axis, means yieldingly forcing said rollers toward said drum, means for rotating said drum, and means for heating said drum.

5. Mechanism for curing rubber strip comprising a cylindrical drum having in its surface a groove of the same shape as the finished strip, a plurality of hollow rollers surrounding said drum and having their axes parallel to the drum axis, said drum having a steam channel adjacent to the groove, means for rotating said drum, and means for admitting steam to said rollers and to said channel.

6. Mechanism for curing rubber strip comprising a cylindrical drum having in its surface a groove of the same shape as the finished strip, a pair of supporting rings located one at each end of said drum and having oppositely arranged apertures therein, a plurality of rollers ranged around said drum parallel to the axis thereof and having their ends journaled in said apertues, means for rotating said drum and means for heating said drum and rollers.

7. Mechanism for curing rubber strip comprising a cylindrical drum having in its surface a groove of the same shape as the finished strip, a pair of supporting rings located one at each end of said drum and having oppositely arranged apertures therein, a plurality of hollow rollers ranged around said drum parallel to the axis thereof and having their ends journaled in said apertures, swivel joints secured to the ends of said rollers, steam pipes connected to said joints, means for admitting steam to the drum interior, and means for rotating said drum.

8. Mechanism for curing rubber strip comprising a cyindrical drum having in its surface a groove of the same shape as the finished strip, a pair of supporting members located one at each end of said drum and having oppositely arranged apertures therein, rollers ranged around said drum parallel to the axis thereof, each roller having reduced ends, a bearing sleeve surrounding each of said ends and located in one of said apertures, means for adjusting said sleeves in said apertures, and means for rotating said drum.

9. Mechanism for curing rubber strip comprising a cylindrical drum having in its surface a groove of the same shape as the finished strip, a pair of supporting members located one at each end of said drum and having oppositely-arranged, radially-disposed, elongated slots, bearing members in said slots, rollers journaled in said bearing members and having their axes parallel to the drum axis, means yieldingly forcing said rollers toward the drum, means for rotating the drum, and means for heating said drum and rollers.

10. Mechanism for curing rubber strip comprising a cylindrical drum having in its surface a helical groove of the same cross-section as the finished strip, means for heating and rotating the drum, and a plurality of rollers arranged around the drum parallel to the drum axis and arranged to press upon the material in said groove.

11. Mechanism for curing rubber strip comprising a cylindrical drum having in its surface a helical groove of the same cross section as the finished strip, means for heating and rotating the drum, means movable along the face of the drum parallel to its axis and arranged to feed raw rubber strip to said groove, and a plurality of rollers arranged around the drum parallel to its axis and arranged to press upon the material in said groove.

12. Mechanism for curing rubber strip comprising a cylindrical drum having in its surface a helical groove of the same cross section as the finished strip, means for heating and rotating the drum, a guide bar parallel to the drum axis, a feeding device movable therealong and having a guide portion through which the strip may pass, means for moving said device along said bar so as to maintain it always in register with said groove, and a plurality of cylindrical rollers arranged around and pressing against said drum.

13. Mechanism for curing rubber strip comprising a cylindrical drum having in its surface a helical groove of the same cross-section as the finished strip, means for heating and rotating the drum, a plurality of cylindrical rollers arranged around and pressing against said drum, a feeding device having a channel through which the strip may pass, means for moving said device along the drum so as to maintain it always in register with the groove, and means operative upon the arrival of said device at the end of the drum for arresting its movement and severing said strip.

14. Mechanism for forming and curing rubber strip, comprising a cylindrical drum having on its exterior a groove of the necessary shape and size, the margins of said groove being sharp and having a shallow channel adjacent thereto, means for heating and rotating said drum, a plurality of rollers arranged around and pressing against the drum, and a brushing device located at one side of said drum and adapted to remove excess material which flows over said margins and into said channel.

15. In mechanism for curing rubber strip, in combination, a cylindrical drum having on its exterior a groove of the necessary shape and size, means for heating and rotating said drum, a plurality of rollers arranged around and pressing against said drum, means for heating at least a part of said rollers, and a heat insulating shell surrounding said drum and rollers.

16. In mechanism for curing rubber strip, in combination, a cylindrical drum having on its exterior a groove of the necessary shape and size, means for heating and rotating said drum, a plurality of rollers arranged around and pressing against said drum, means for heating at least a part of said rollers, and a heat-insulating shell surrounding said drum and rollers, said shell having elongated apertures therein parallel to the axis of the drum for the continuous admission and removal of the strip.

17. Mechanism for the manufacture of rubber strip comprising, in combination, a tube mill for raw rubber composition of the requisite size and approximate shape, a heated cylindrical drum rotated at substantially the same peripheral speed as the speed of issue of said strip, said drum having a helical groove of the desired cross-section into which said strip is fed, a plurality of cylindrical rollers arranged around and pressing against said drum, a cooling device to which said strip passes as it leaves said drum, and a winding device located after said cooling device.

18. The process of continuously curing a rubber strip which comprises the steps of winding the strip progressively upon the exterior of a heated drum whose periphery is formed with a helical groove of requisite shape, the length of the groove and speed of the drum being such that the first portion of the strip will become sufficiently cured by the time the groove is filled, and thereupon beginning to unwind the cured strip, severing the raw strip, and again beginning the winding of the same into the groove just emptied of the finished strip.

In testimony whereof, we hereunto affix our signatures.

HARVEY F. MARANVILLE.
CHARLES W. STEELE.